United States Patent
Noh et al.

(10) Patent No.: US 8,956,751 B2
(45) Date of Patent: Feb. 17, 2015

(54) BATTERY PACK AND BATTERY MODULE HAVING THE SAME

(71) Applicant: Samsung SDI Co., Ltd., Yongin-si, Gyeonggi-do (KR)

(72) Inventors: Kyoung-Hwan Noh, Yongin-si (KR); Jun-Ho Lee, Yongin-si (KR); Hyun-Kook Kim, Yongin-si (KR); Hyun-Joong Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 109 days.

(21) Appl. No.: 13/732,630

(22) Filed: Jan. 2, 2013

(65) Prior Publication Data

US 2013/0288094 A1    Oct. 31, 2013

(30) Foreign Application Priority Data

Apr. 30, 2012   (KR) .................. 10-2012-0045568

(51) Int. Cl.
*H01M 2/10* (2006.01)
*H01M 2/02* (2006.01)

(52) U.S. Cl.
CPC .............. *H01M 2/1077* (2013.01); *Y02E 60/12* (2013.01); *H01M 2/0217* (2013.01)
USPC .......................................................... 429/99

(58) Field of Classification Search
CPC  Y02E 60/12; H01M 2/1077; H01M 10/5016; H01M 10/5032; H01M 10/5051; H01M 2/0217
USPC .............................................. 429/99, 156, 159
See application file for complete search history.

(56) References Cited

U.S. PATENT DOCUMENTS

| | | | |
|---|---|---|---|
| 2006/0127754 A1 | 6/2006 | Hamada et al. | |
| 2011/0039147 A1 | 2/2011 | Cheon et al. | |
| 2011/0117419 A1 | 5/2011 | Lee et al. | |
| 2011/0151308 A1* | 6/2011 | Yoon ............................. | 429/151 |
| 2011/0151309 A1* | 6/2011 | Park et al. ..................... | 429/151 |
| 2011/0151311 A1* | 6/2011 | Lee et al. ...................... | 429/156 |

FOREIGN PATENT DOCUMENTS

| | | |
|---|---|---|
| JP | 2006-196449 A | 7/2006 |
| KR | 10 2011-0017778 A | 2/2011 |
| KR | 10 2011-0055360 A | 5/2011 |
| KR | 10 2011-0070198 A | 6/2011 |
| KR | 10 2011-0073221 A | 6/2011 |

* cited by examiner

*Primary Examiner* — Stewart Fraser
(74) *Attorney, Agent, or Firm* — Lee & Morse, P.C.

(57) ABSTRACT

A battery pack includes first and second end plates spaced apart from each other along a first direction, a plurality of battery cells aligned along the first direction between the first and second end plate, each battery cell having an electrode terminal thereon, and a side plate extending along side surfaces of the battery cells and coupled to the first and second end plates, the side plate having first coupling portions along upper edges of the side plate, the first coupling portions being bent to extend away from the battery cells, and second coupling portions along lower edges of the side plate, the second coupling portions being bent to extend away from the battery cells and to face the first coupling portions, the second coupling portions being positioned to at least partially correspond to respective first coupling portions.

19 Claims, 8 Drawing Sheets

BATTERY PACK AND BATTERY MODULE HAVING THE SAME

CROSS-REFERENCE TO RELATED APPLICATION

This application claims the benefit under 35 U.S.C. §119 of Korean Patent Application No. 10-2012-0045568, filed on Apr. 30, 2012, in the Korean Intellectual Property Office, the disclosure of which is incorporated herein in its entirety by reference.

BACKGROUND

1. Field

One or more embodiments relates to a battery pack and to a battery module having two or more battery packs that are stacked and modularized.

2. Description of the Related Art

In general, secondary cells are rechargeable cells, unlike primary cells that are not rechargeable. Secondary cells may be used as an energy source for, e.g., mobile devices, electric vehicles, hybrid vehicles, electric bicycles, uninterruptible power supply apparatuses, etc. The secondary cells may be used in a form of a single battery cell according to the types of external devices to which the secondary cells are applied. Also, the secondary cells may be used in a form of a battery pack including a plurality of battery cells that are connected and combined into one unit, and further in a form of a battery module in which a plurality of battery packs are stacked and modularized.

A compact mobile device, e.g., a mobile phone, may be operated for a predetermined time in accordance with output and capacity of a single cell. However, when long-time driving or high power driving is needed, e.g., in a case of electric vehicles or hybrid vehicles that consume a large amount of electric power, a battery pack or a battery module is preferred to provide increased output and capacity, as an output voltage or output current may be increased by increasing the number of built-in battery cells.

SUMMARY

One or more embodiments include a battery pack and a battery module having a coupling structure for structurally combining neighboring battery packs into a single assembly.

According to one or more embodiments, a battery pack may include first and second end plates spaced apart from each other along a first direction, a plurality of battery cells aligned along the first direction between the first and second end plate, each battery cell having an electrode terminal thereon, and a side plate extending along side surfaces of the battery cells and coupled to the first and second end plates, the side plate having first coupling portions along upper edges of the side plate, the first coupling portions being bent to extend away from the battery cells, and second coupling portions along lower edges of the side plate, the second coupling portions being bent to extend away from the battery cells and to face the first coupling portions, the second coupling portions being positioned to at least partially correspond to respective first coupling portions.

The side plate may further include a coupling hole in each of the first and second coupling portions, a penetrating coupling member inserted in the coupling hole of the first coupling portion, and a combining coupling member coupled to the penetrating coupling member.

The penetrating coupling member and the combining coupling member may be a bolt and a nut, respectively.

The side plate may further include an installation hole in the second coupling portion, the installation hole having a shape of an elongated slot.

The first coupling portions may be spaced apart from each other along the first direction, and the second coupling portions are spaced apart from each other along the first direction.

The battery pack may further include at least one third coupling portion between adjacent first coupling portions, the first and third coupling portions being at different heights relative to the second coupling portions, and the third coupling portion being bent away from the plurality of battery cells.

The side plate may further include a tool insertion opening in the first coupling portion, the tool insertion opening being an elongated indent from an edge of the first coupling portion.

The tool insertion opening may expose at least one of a coupling hole and an installation hole in a corresponding second coupling portion.

The side plate may further include first and second position determination portions in the second coupling portions, the first and second position determination portions having complementary shapes and are spaced apart from each other along the first direction.

The first position determination portion may have an inwardly indented shape and the second position determination portion has an outwardly protruding shape.

The side plate may include first and second side plates overlapping opposites side surfaces of the plurality of battery cells, the first position determination portion of the first side plate and the second position determination portion of the second side plate are aligned, and the second position determination portion of the first side plate and the first position determination portion of the second side plate are aligned.

According to one or more embodiments, a battery module may include first and second battery packs stacked along a first direction, each of the first and second battery packs having a plurality of battery cells aligned along a first direction between first and second end plate, each battery cell having an electrode terminal thereon, a side plate extending along side surfaces of the battery cells and coupled to the first and second end plates, the side plate having first coupling portions along upper edges of the side plate, the first coupling portions being bent to extend away from the battery cells, and second coupling portions along lower edges of the side plate, the second coupling portions being bent to extend away from the battery cells and to face the first coupling portions, the second coupling portions being positioned to at least partially overlap respective first coupling portions.

The first direction may be vertical, first coupling portions of the first battery pack being coupled to second coupling portions of the second battery pack via a first coupling member inserted through the first and second coupling portions.

A second coupling member may be coupled to the first coupling member in the first coupling portion.

The first and second coupling members may be a bolt and a nut, respectively.

The first direction may be horizontal, the side plate of each of the first and second battery packs may include a third coupling member bent away from the plurality of battery cells, and the first and second battery packs may be coupled to each other by a first coupling member passing through a fixing bracket and the third coupling portion of each of the first and second battery packs.

The fixing bracket may include coupling holes corresponding to the third coupling portions of the first and second battery packs, one of the coupling holes in having an elongated slot shape.

The fixing bracket may further include a strength reinforcement portion having a bent shape.

The third coupling portion may include a second coupling member coupled to the first coupling member.

The first and second coupling members may be a bolt and a nut.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Figure 1:
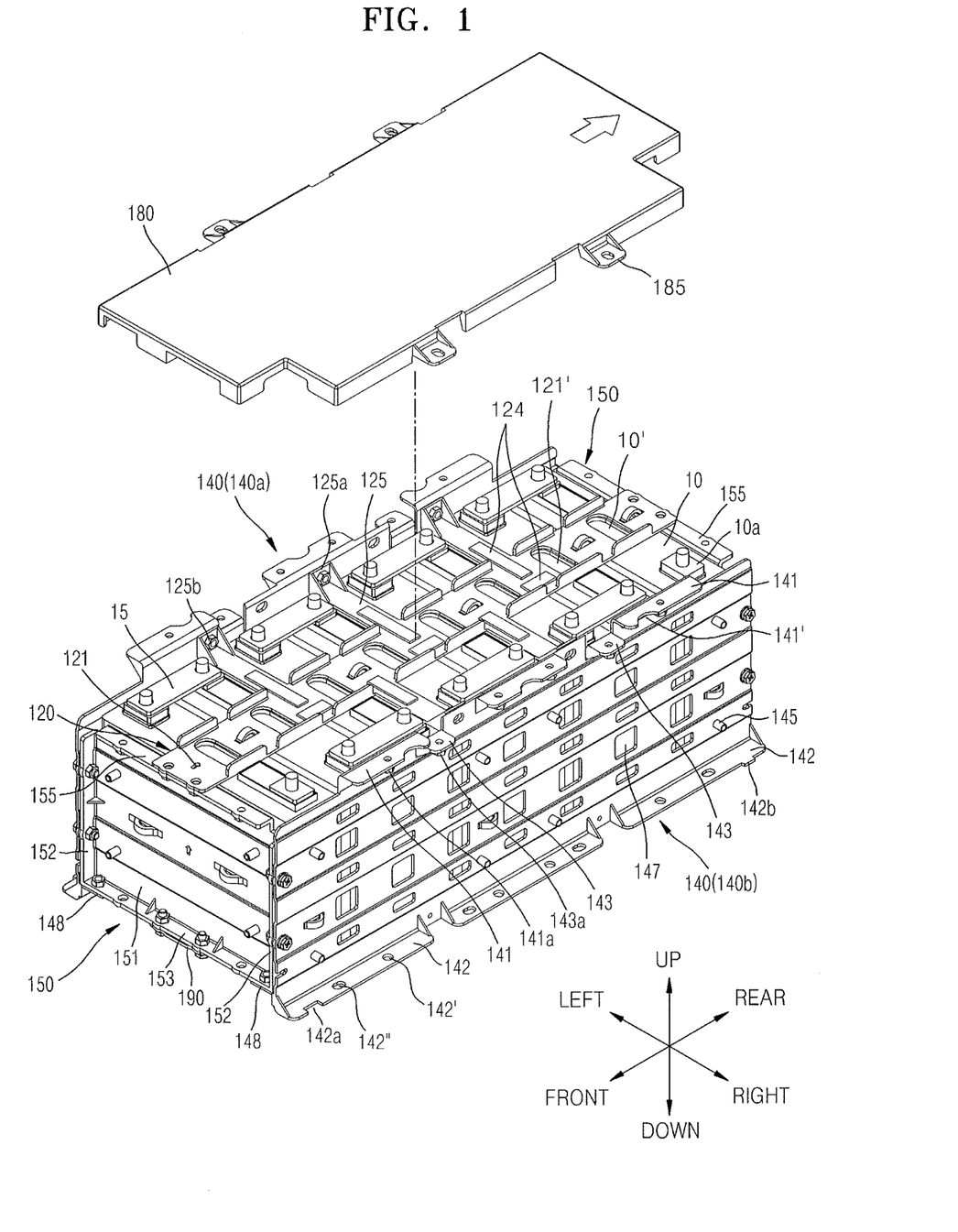
FIG. 1 illustrates an exploded perspective view of a battery pack according to an embodiment.

FIG. 1 is an exploded perspective view of a battery pack according to an embodiment. Referring to FIG. 1, a battery pack according to the present embodiment may include a plurality of battery cells 10 arranged in a row in one direction, e.g., from a front to a rear direction. Plates 120, 140, and 150 may encompass the rows of the battery cells 10.

Figure 2:
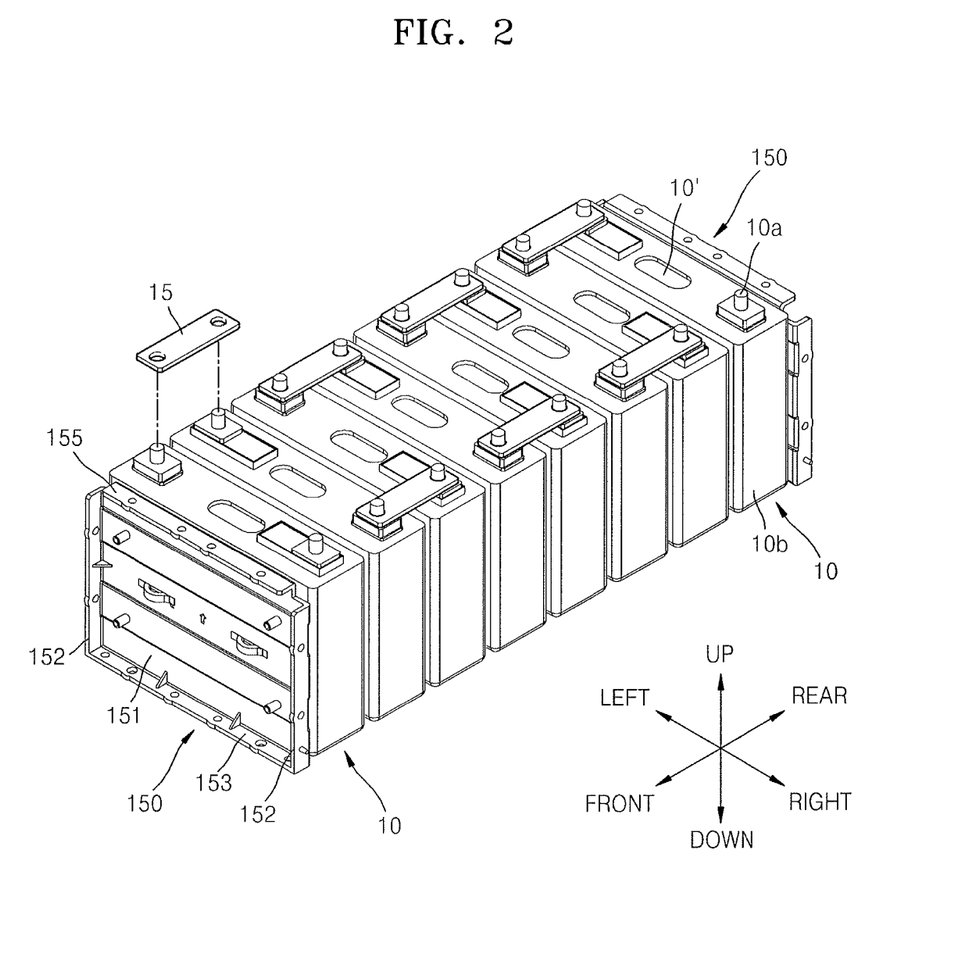
FIG. 2 illustrates a perspective view of an arrangement of battery cells in the battery pack of FIG. 1.

FIG. 2 is a perspective view of an arrangement of the battery cells 10 of FIG. 1. Referring to FIG. 2, secondary cells, e.g., lithium ion batteries or polymer batteries, may be used as the battery cells 10. Secondary cells having a variety of shapes, e.g., cylindrical secondary cells, rectangular secondary cells, or polygonal secondary cells, may be used as the battery cells 10, but not limited to any one of the shapes.

As illustrated in FIG. 2, for example, each of the battery cells 10 may include a case 10b, an electrode assembly (not shown) accommodated in the case 10b, and an electrode terminal 10a electrically connected to the electrode assembly and drawn out of the case 10b. For example, the electrode terminal 10a may form an upper portion of each of the battery cells 10 and may be exposed outside the case 10b. Although it is not illustrated, the electrode assembly includes a positive electrode, a separator, and a negative electrode, and may be formed in a form of a winding type or a stack type. The case 10b accommodates the electrode assembly therein and the electrode terminal 10a is drawn out of the case 10b for electrical connection between the electrode assembly and an external circuit.

For example, neighboring, e.g., adjacent, battery cells 10 may be electrically connected to each other via a connection of the electrode terminal 10a in series or in parallel. For example, neighboring electrode terminals 10a may be connected to each other via a bus bar 15.

A safety vent 10' may be formed in the case 10b. The safety vent 10' is designed with a relatively weak strength, so internal gas may be ejected through the safety vent 10' when an internal pressure over a critical point is generated in the case 10b.

A pair of end plates 150 may be arranged at opposite ends in the row direction of the battery cells 10. One surface of each of the end plates 150 is arranged to face an outer surface of an outermost battery cell 10, so the pair of end plates 150 combines a group of the battery cells 10 into one unit. The end plates 150 restrict volume expansion of the battery cells 10 according to a charge/discharge operation and maintain resistance characteristic so that deterioration of electric characteristic of the battery cells 10 may be prevented.

The end plates 150 may include a base plate 151 and flange portions 152, 153, and 155 that are bent from edges of the base plate 151 in a direction opposite to the battery cells 10. The base plate 151 may have a large size enough to cover an outer surface of the battery cells 10.

The flange portions 152, 153, and 155 are bent from the edges of the base plate 151 in a direction opposite to the battery cells 10, i.e., away from the battery cells 10. The flange portions 152, 153, and 155 may include a pair of side flange portions 152 formed at opposite side surfaces of the base plate 151 and upper and lower flange portions 153 and 155 respectively formed at upper and lower portions of the base plate 151. The flange portions 152, 153, and 155 may provide a coupling position for coupling between the end plates 150 and an adjacent element.

For example, as illustrated in FIG. 1, the flange portions 152, 153, and 155 of the end plates 150 may facilitate coupling with a side plate 140 and with a top plate 120 assembled to be in contact with each other along edges of the end plates 150. Also, the flange portions 152, 153, and 155 may reinforce mechanical strength of the end plates 150.

In detail, the side flange portion 152 provides a coupling position for facilitating coupling between each of the end plates 150 and a respective side plate 140. An end portion of the side plate 140 folded onto the side flange portion 152 may be coupled to the side flange portion 152 via screw coupling. To this end, a plurality of coupling holes may be formed in the side flange portion 152.

The side plate 140 may be arranged at the side surfaces of the battery cells 10 to cover side surfaces of the battery cells 10 that are arranged in a row, e.g., the side plate 140 may continuously overlap all the plurality of battery cells 10 arranged in the row direction. The side plate 140 may include first and second side plates 140a and 140b arranged at opposite side surfaces of the battery cells 10, e.g., the plurality of battery cells 10 may be arranged in the row direction between the first and second side plates 140a and 140b. The side plate 140 extends in the row direction of the battery cells 10. First and second end portions of each of the first and second side plates 140a and 140b may be coupled to the pair of end plates 150 arranged at opposite sides of the plurality of the row of battery cells 10 to define a frame, so the frame may surround the row of battery cells 10. The first and second side plates 140a and 140b may be screw coupled to the side flange portions 152 of the end plates 150. Also, the side plate 140 and the side flange portions 152 may be screw coupled by using a coupling member, e.g., bolts and nuts, after arranging the side plate 140 and the side flange portion 152 to overlap each other and after matching the coupling holes. The side plate 140 may be sufficiently long to overlap all the battery cells 10 arranged in the row direction, i.e., the row of battery cells 10, and to overlap the side flange portions 152 on each of the end plates 150, so the side plate 140 and the flange portions 152 may form a surface contact therebetween for the screw coupling.

The side plate 140 may be formed in a form of a plate as a whole and may include a step portion 148 bent toward the battery cells 10 to support part of a bottom surface of each of the battery cells 10. For example, each of the first and second side plates 140a and 140b may include a step portion 148, so when the first and second side plates 140a and 140b are arranged at opposite sides of the row of the battery cells 10 to face each other, each of the step portions 148 may overlap and support a portion of the row of battery cells 10. The step portions 148 of the first and second side plates 140a and 140b may be bent, e.g., at a perpendicular angle, relatively to respective side plates 140 and may face each other.

The step portion 148 may extend across the entire length of the side plate 140 in the row direction, i.e., the front and rear direction, of the battery cells 10. That is, the step portion 148 may continuously overlap all of the battery cells 10 in the row of battery cells 10. Each end portion of the step portion 148 may be screw coupled to a corresponding lower flange portion 153 of each of the end plates 150. To this end, coupling holes may be formed in the step portion 148 and the lower flange portion 153. After the coupling holes of the step portion 148 and the lower flange portion 153 are matched, e.g., aligned, with each other, the side plate 140 and each of the end plates 150 may be screw coupled by using a coupling member that couples the side plate 140 and each of the end plates 150 by penetrating the step portion 148 and the lower flange portion 153. The step portion 148 and the lower flange portion 153 may form surface contact as the step portion 148 and the lower flange portion 153 contact each other at a corner position of a battery pack. As such, the side plate 140 is coupled both to the side flange portion 152 and the lower flange portion 153, e.g., via a side surface and the step portion, along the side and lower edges of each of the end plates 150, thereby forming a space for accommodating the battery cells 10.

A heat dissipation hole 147 may be formed in the side plate 140. For example, the heat dissipation hole 147 may be formed at a plurality of positions of the side plate 140 in a constant pattern. The heat dissipation hole 147 allows contact between the battery cells 10 and external air so that heat generated in the battery cells 10 may be quickly exhausted.

Figure 3:
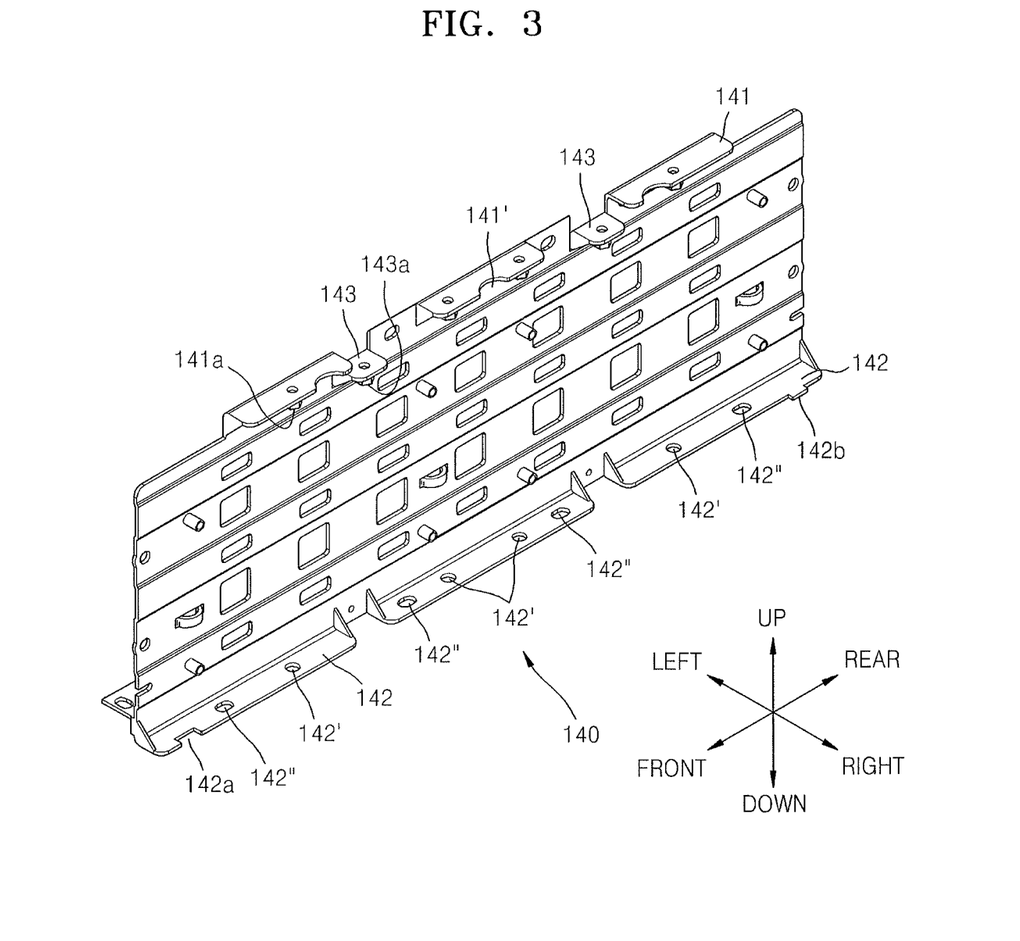
FIG. 3 illustrates a magnified perspective view of a side plate in the battery pack of FIG. 1.

FIG. 3 is a magnified perspective view of the side plate 140. A first coupling portion 141 and a second coupling portion 142 may be formed at opposite edges of each side plate 140. The first and second coupling portions 141 and 142 may be connected to the side plate 140 and may extend away from the battery cells 10. In other words, the first and second coupling portions 141 and 142 may be formed in a shape of a flange bent from a main body of the side plate 140 in a direction opposite to the battery cells 10. The first and second coupling portions 141 and 142 may be respectively formed in an upper end portion and a lower end portion of the side plate 140. For example, the first and second coupling portions 141 and 142 may be arranged to face each other, e.g., to parallel each other, by being bent in a direction opposite to the battery cells 10.

The first coupling portions 141 may be formed at positions at least partially corresponding to the second coupling portions 142, e.g., each first coupling portion 141 may at least partially overlap a respective second coupling portion 142. That is, a plurality of each of the first and second coupling portions 141 and 142 may be formed, so the number and positions of the first coupling portions 141 may correspond to those of the second coupling portions 142. The plurality of each of the first and second coupling portions 141 and 142 may be separated from each other in the front and rear directions along an upper end portion and a lower end portion of the side plate 140. For example, as illustrated in FIG. 3, a plurality, e.g., three, of first coupling portions 141 may be spaced apart from each other along the upper end portion of the side plate, and a plurality, e.g., three, of the second coupling portions 142 may be spaced apart from each other along the lower end portion of the side plate 140. For example, each of the first coupling portions 141 may at least partially overlap a corresponding second coupling portion 142.

When two or more battery packs are stacked in a vertical direction, i.e., in an up and down direction, and modularized, the first and second coupling portions 141 and 142 provide a coupling structure of structurally combining the battery packs neighboring in the vertical direction. The first coupling portion 141 of one battery pack may be coupled to the second coupling portion 142 of another battery pack arranged directly above the battery pack. The second coupling portion 142 of one battery pack may be coupled to the first coupling portion 141 of another battery pack arranged directly under the battery pack.

Figure 4:
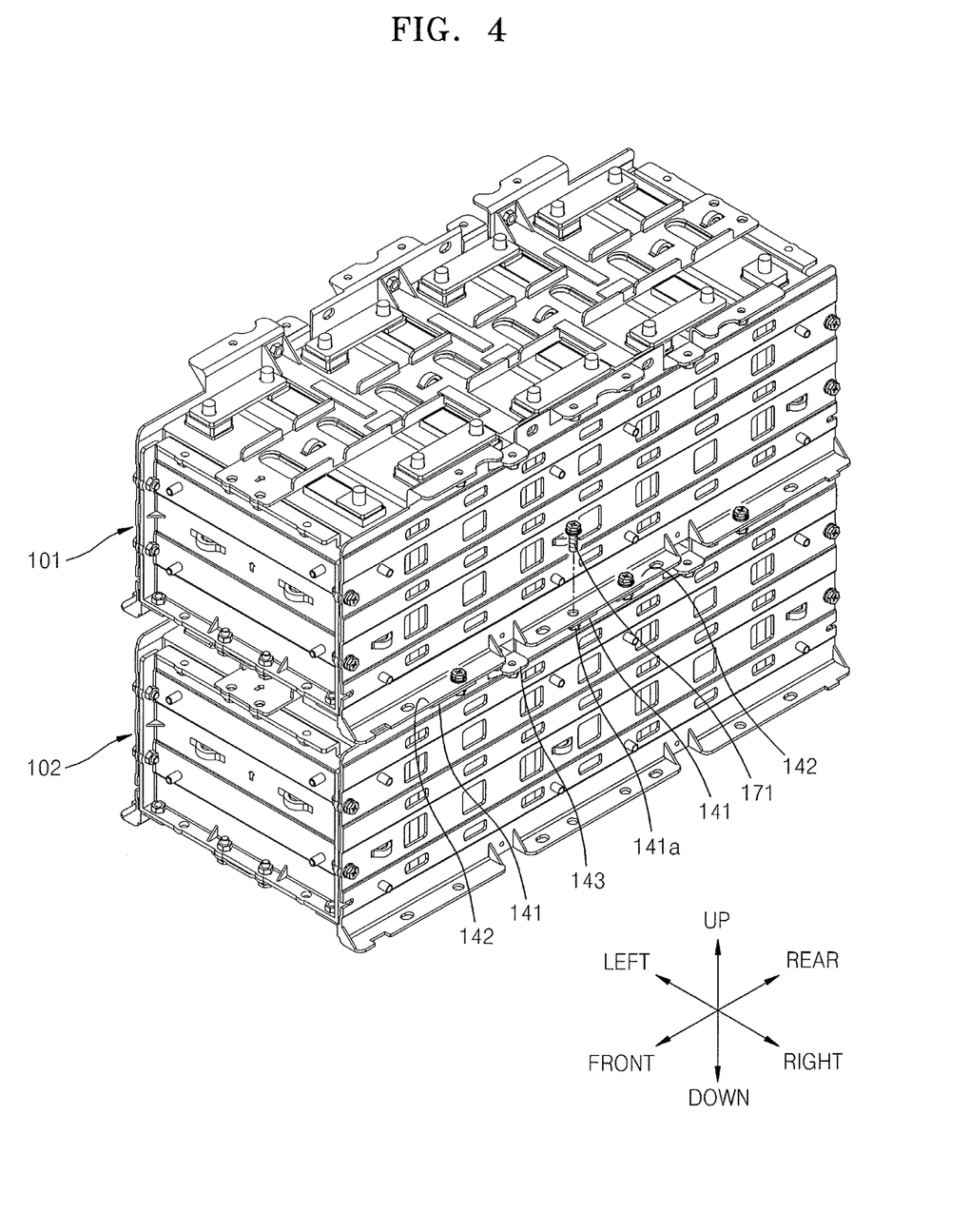
FIG. 4 illustrates a perspective view of a battery module having two or more vertically stacked and modularized battery packs according to an embodiment.

FIG. 4 is a perspective view of a battery module in which two or more battery packs are vertically stacked and modularized. Referring to FIG. 4, the battery module includes an upper battery pack 101 arranged in an upper portion of the battery module and a lower battery pack 102 arranged in a lower portion of the battery module.

As illustrated in FIG. 4, the second coupling portion 142 formed in a lower end portion of the upper battery pack 101 is arranged in contact with the first coupling portion 141 formed in an upper end portion of the lower battery pack 102. When the coupling holes formed in the first and second coupling portions 141 and 142 are matched, e.g., aligned, with each other, a penetrating coupling member 171 is inserted through the holes to connect the upper battery pack 101 and the lower battery pack 102 to each other. A combining coupling member 141a that is combined with the penetrating coupling member 171 may be provided in the first coupling portion 141.

For example, the first and second coupling portions 141 and 142 of neighboring battery packs stacked in the vertical direction may be screw coupled. The penetrating coupling member 171 that is inserted and assembled by passing through the first and second coupling portions 141 and 142 may include a bolt member, whereas the combining coupling member 141a that is coupled to the penetrating coupling member 171 passing through the first and second coupling portions 141 and 142 may include a nut member. In other words, the penetrating coupling member 171 inserted in the second coupling portion 142 of the upper battery pack 101 may pass through the first coupling portion 141 of the lower battery pack 102 and screw coupled to the combining coupling member 141a provided in the first coupling portion 141.

Referring back to FIG. 3, the first and second coupling portions 141 and 142 may extend to different lengths along the upper and lower end portions of the side plate 140. For example, the second coupling portion 142 in the lower end portion may extend longer than the first coupling portion 141 in the upper end portion. The second coupling portion 142 formed in the lower end portion of the side plate 140 may form a bottom portion in a battery module where a plurality of battery packs are stacked and function as a support for supporting the whole module. Also, since the second coupling portion 142 that provides a coupling structure between a battery module and a mount structure (not shown) for fixing the battery module is extensively formed across a large area, a coupling area may be increased.

As further illustrated in FIG. 3, a coupling hole 142' and an installation hole 142" may be formed in the second coupling portion 142. The coupling hole 142' and the installation hole 142" may be formed in parallel in a lengthwise direction, i.e., the front and rear direction, of the second coupling portion 142, or in different shapes. In other words, while the coupling hole 142' may be formed as a substantially circular hole, the installation hole 142" may be formed as an elongated slot extending in the lengthwise direction, i.e., the front and rear direction, of the second coupling portion 142.

In the structure where a plurality of battery packs are stacked and modularized, the second coupling portion 142 of the lowermost battery pack faces the mount structure for fixing the position of a battery module and may be coupled to the mount structure. In other words, a coupling member (not shown) may pass through the coupling hole 142' and the installation hole 142" of the second coupling portion 142, e.g., in a lowermost battery pack of a plurality of vertically stacked battery packs, to be coupled to the mount structure so that the position of a battery module may be fixed.

For example, after the battery module is coupled to the mount structure through the coupling hole 142' of the second coupling portion 142, an additional coupling may be made through the installation hole 142" of the second coupling portion 142. In doing so, a coupling position may be changed by the installation hole 142" that is an elongated slot in a major axis direction, i.e., the front and rear direction, to a degree. This is in consideration of a processing error of the battery module and/or the mount structure. As a result, the coupling position may be corrected, e.g., adjusted along the elongation direction of the slot, through the installation hole 142" that is the elongated slot. In contrast, when both of the coupling hole and the installation hole are circular, a defect of misalignment of the coupling positions between the coupling hole and the installation hole due to a processing error may not be easily adjusted.

As illustrated in FIG. 3, a tool insertion opening 141' may be provided in the first coupling portion 141. For example, the tool insertion opening 141' may have a shape of an indent from an edge of the first coupling portion 141, e.g., an oval cut shape. For example, the tool insertion opening 141' may have a longer length in the lengthwise direction, i.e., the front and rear direction, of the first coupling portion 141 than in a perpendicular direction, i.e., the left and right directions. Accordingly, a working tool (not shown) inserted through the tool insertion opening 141' may have a degree of freedom along the lengthwise direction, i.e., the front and rear direction, of the first coupling portion 141. The tool insertion opening 141' may be formed in each first coupling portion 141.

The tool insertion opening 141' may be used for a working tool entering via a pathway of the first coupling portion 141 to approach the second coupling portion 142 and perform a coupling work on the first and second coupling portions 141 and 142 respectively formed in the upper and lower end portions of the side plate 140 corresponding to each other. For example, in a coupling work between the second coupling portion 142 of the lowermost battery pack of the battery module and the mount structure for fixing the battery module, a working tool for coupling, e.g., a screw driver, may approach the second coupling portion 142 through the tool insertion opening 141' of the first coupling portion 141 and perform a coupling operation. Accordingly, the working tool may approach the second coupling portion 142 and perform a coupling operation avoiding mechanical interference between the working tool and the first coupling portion 141.

A third coupling portion 143 may be formed in the upper end portion of the side plate 140 by being bent in a direction opposite to the battery cells 10. The third coupling portion 143 may be formed at a plurality of positions along the upper end portion of the side plate 140, and each third coupling portion 143 may be formed between two adjacent, e.g., neighboring, first coupling portions 141. For example, the third coupling portion 143 may be formed at a stepped height with respect to the first coupling portion 141 and may be formed at a level lower than the first coupling portion 141 in a vertical direction. When the first and third coupling portions 141 and 143 are formed at different heights relatively to the second coupling portion 142, mechanical interference may be avoided during the coupling work.

The third coupling portion 143 may provide a coupling structure to structurally combine horizontally neighboring battery packs in a structure in which two or more battery packs are stacked in a horizontal direction, i.e., a left and right direction, and modularized.

Figure 5:
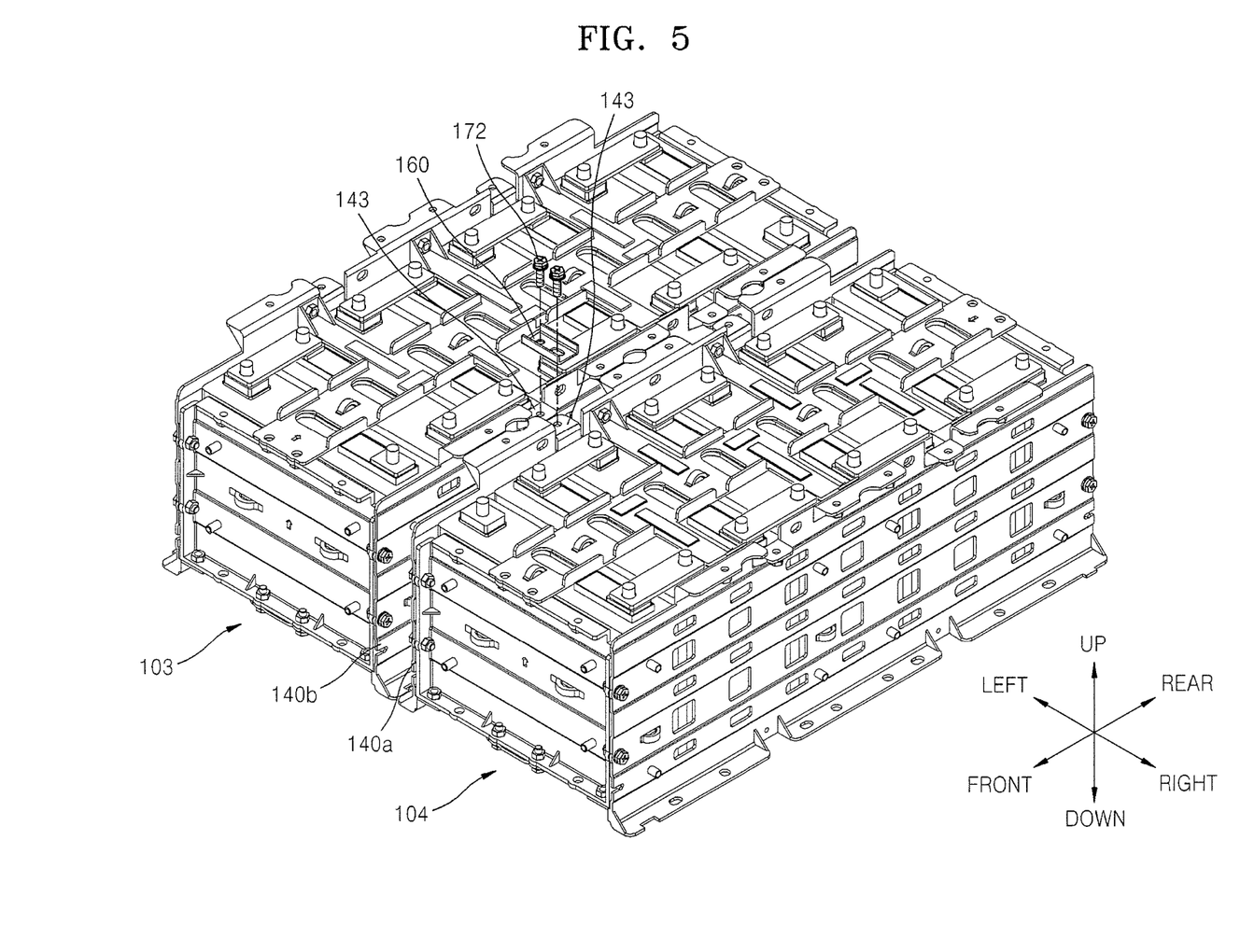
FIG. 5 illustrates a perspective view of a battery module having two or more horizontally stacked and modularized battery packs according to an embodiment.

FIG. 5 is a perspective view of a battery module in which two or more battery packs are stacked in the horizontal direction, i.e., the left and right direction, and modularized. Referring to FIG. 5, the battery module includes a left battery pack 103 arranged at the left side and a right battery pack 104 arranged at the right side. The left and right battery packs 103 and 104 include the third coupling portions 143 bent in directions to face each other from the side plates 140a and 140b arranged facing each other.

Figure 6:
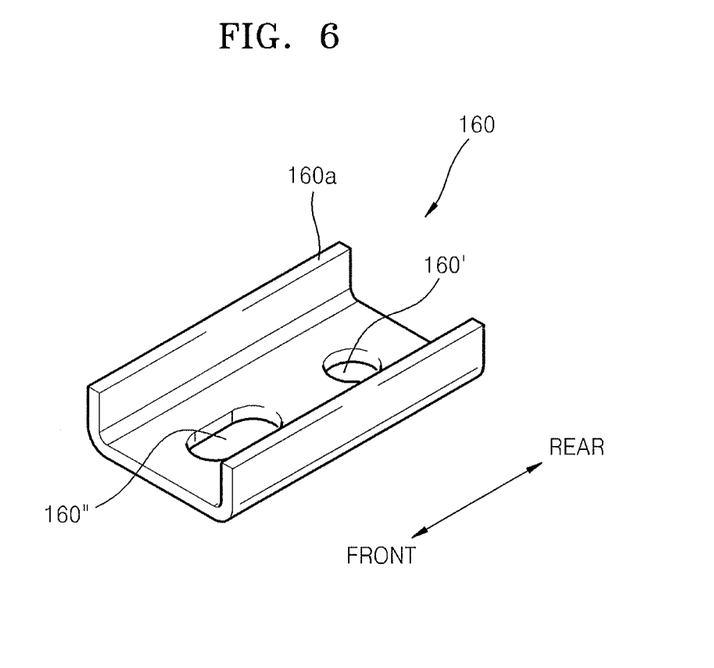
FIG. 6 illustrates a perspective view of a fixing bracket in the battery module of FIG. 5.

The third coupling portions 143 of the horizontally neighboring battery packs may be connected by using a fixing bracket 160 (see FIG. 6). In other words, the third coupling portions 143 of the neighboring battery packs are arranged parallel to each other and the fixing bracket 160 is placed on the neighboring third coupling portions 143. After coupling holes of the third coupling portion 143 and the fixing bracket 160 are matched, e.g., aligned, with each other, the horizontally neighboring battery packs 103 and 104 may be combined by using a pair of penetrating coupling members 172 passing through the third coupling portion 143 and the fixing bracket 160.

Referring to FIGS. 3 and 5, a combining coupling member 143a (see FIG. 3) to which the penetrating coupling member 172 is coupled may be provided at the third coupling portion 143 of the side plate 140. For example, the third coupling portion 143 of the neighboring battery packs 103 and 104 may be screw coupled. The penetrating coupling member 172 assembled by penetrating the fixing bracket 160 and the third coupling portion 143 may include a bolt member, whereas the combining coupling member 143a coupled to the penetrating coupling member 172 passing through the third coupling portion 143 may include a nut member.

FIG. 6 is a perspective view of the fixing bracket 160. Referring to FIG. 6, a pair of a first coupling hole 160' that is a circular hole and a second coupling hole 160" that is an elongated slot may be parallelly formed in the fixing bracket 160. For example, the first coupling hole 160' may be substantially formed as a circular hole, whereas the second coupling hole 160" may be elongated in the lengthwise direction, i.e., a front and rear direction, of the fixing bracket 160.

After one of the neighboring third coupling portions 143 is coupled through the first coupling hole 160', the other third coupling portion 143 may be coupled through the second coupling hole 160". For example, after the coupling portions 143 of the left battery pack 103 is coupled with the penetrating coupling member 172 through the first coupling hole 160', the third coupling portion 143 of the right battery pack 104 may be coupled with the penetrating coupling member 172 through the second coupling hole 160". The coupling position of the second coupling hole 160" may be adjusted in the lengthwise direction of the fixing bracket 160, i.e., the front and rear direction, due to the elongated shape of the second coupling hole 160". This is in consideration of a processing error. The coupling position may be corrected according to the processing error of the neighboring battery packs by forming the second coupling hole 160" in a form of a slot. In contrast, if both of the coupling holes are formed as circular holes, a defect of misalignment of the coupling positions between the fixing bracket 160 and the third coupling portion 143 due to a processing error may not be easily fixed.

The fixing bracket 160 is used for coupling neighboring battery packs and may have mechanical strength over a certain level. To this end, a bending portion 160a having a bent shape may be formed in the fixing bracket 160. The bending portion 160a may provide sufficient mechanical strength to resist twist deformation or a compression force transferred to the fixing bracket 160 according to external vibrations or shocks. For example, the bending portion 160a may include portions bent from both side surfaces of the fixing bracket 160 in directions facing each other.

Referring back to FIG. 3, position determination portions 142a and 142b may be provided in the side plate 140. For example, the position determination portions 142a and 142b may be formed in the second coupling portion 142 in the lower end portion of the side plate 140. The position determination portions 142a and 142b may include first and second position determination portions 142a and 142b formed at different positions in the lengthwise direction, i.e., in the front and rear direction, of the side plate 140. The position determination portions 142a and 142b may have complementarily fitting shapes and may include the first position determination portion 142a formed inwardly indented and the second position determination portion 142b protruding outwardly.

In the structure in which the battery packs are stacked in the horizontal direction, i.e., the left and right direction, and modularized, the position determination portions 142a and 142b may align the positions of the neighboring battery packs. The shape of the first position determination portion 142a complementarily fits that of the second position determination portion 142b of a neighboring battery pack in the horizontal direction, i.e., in the left and right direction. The shape of the second position determination portion 142b complementarily fits that of the first position determination portion 142a of a neighboring battery pack in the horizontal direction, i.e., the left and right direction.

Figure 7:
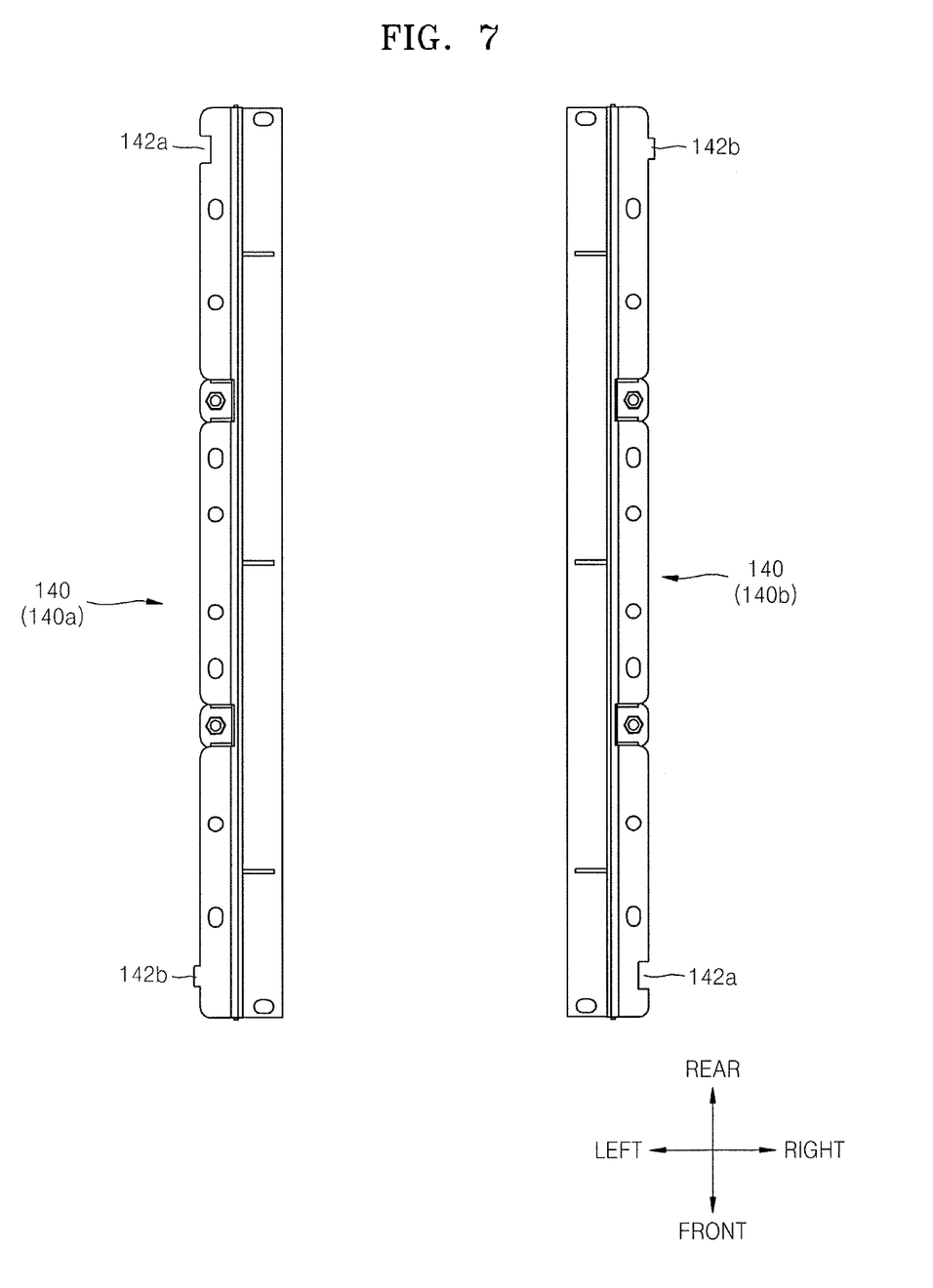
FIG. 7 illustrates a view of a lower portion of a side plate where first and second position determination portions are formed.

FIG. 7 is a top view of the side plate 140, i.e., a lower portion where the first and second position determination portions 142a and 142b are formed. Referring to FIG. 7, the first and second position determination portions 142a and 142b may be formed in each of the first and second side plates 140a and 140b. The first and second position determination portions 142a and 142b may be formed asymmetrical in the first and second side plates 140a and 140b. For example, the first position determination portion 142a may be inwardly indented and may be formed both at a rear side of the first side plate 140a and at a front side of the second side plate 140b. In another example, the second position determination portion 142b may protrude outwardly and may be formed both at a front side of the first side plate 140a and at a rear side of the second side plate 140b. In other words, the second position determination portion 142b of the first side plate 140a and the first position determination portion 142a of the second side plate 140b may be formed at the same position in the front and rear direction, while the first position determination portion 142a of the first side plate 140a and the second position determination portion 142b of the second side plate 140b may be formed at the same position in the front and rear direction.

Forming the first and second position determination portions 142a and 142b at asymmetrical positions may form the first and second position determination portions 142a and 142b between neighboring battery packs at positions facing each other. The second and first position determination portions 142b and 142a formed at the front and rear sides of the first side plate 140a may form fitting shapes with the first and second position determination portions 142a and 142b formed at the front and rear sides of the second side plate 140b.

Referring to FIG. 1, a boss member 145 for installing a circuit board (not shown) for forming a battery management system (BMS) may be formed in the side plate 140. In other words, one surface of the side plate 140 may face the side surface of each of the battery cells 10 and the circuit board may be installed at the other surface of the side plate 140. For example, the circuit board may monitor a charge/discharge state of each of the battery cells 10 and control a general charge/discharge operation of a battery pack.

For example, the boss member 145 may be arranged at four positions in a form of a lattice corresponding to the circuit board having an approximately rectangular or square shape, or may be arranged at positions equivalent to a multiple of four (4) in a form of a lattice corresponding to the circuit board. Although it is not illustrated, a coupling hole may be formed in the circuit board. As a screw member passing through the coupling hole is coupled to the boss member 145 on the side plate 140, the circuit board may be fixed to the side plate 140.

The top plate 120 may be arranged on top of each of the battery cells 10, e.g., to overlap all of the battery cells 10. The top plate 120 may include a base frame 121 extending across the top center portion of the battery cells 10 in the row direction, i.e., the front and rear direction, of the battery cells 10 and a support frame 125 extending from the base frame 121 toward the side plate 140.

An opening portion 121' may be formed in the base frame 121 at a position corresponding to the safety vent 10' of each of the battery cells 10. One end portion and the other end portion of the base frame 121 may be coupled to the end plates 150 arranged at the opposite ends of the battery cells 10. The base frame 121 may form screw coupling with the upper flange portion 155 formed in the upper end of the end plate 150. In detail, after the base frame 121 and the upper flange portion 155 overlap each other, i.e., so the coupling holes match each other, the base frame 121 and the upper flange portion 155 may be screw coupled to each other by using a coupling member, e.g., a bolt and nut. The base frame 121 and the upper flange portion 155 may form surface contact with each other across at least part thereof through the screw coupling.

The base frame 121 supports the end plates 150 arranged at the opposite ends of the battery cells 10 in the row direction, i.e., the front and rear direction, and maintains a predetermined distance between the end plates 150. Thus, expansion of the battery cells 10 may be reduced and deterioration of a charge/discharge characteristic due to deformation of the battery cells 10 may be prevented.

The support frame 125 may be coupled to the side plates 140 across the top portion of the battery cells 10 in a direction crossing the base frame 121. For example, the support frame 125 may extend in a direction perpendicular to the base frame 121, i.e., the left and right direction. The base frame 125 may be integrally formed with the base frame 121.

In detail, the support frame 125 may extend from the base frame 121 to be coupled to the side plate 140. For example, one end portion of the support frame 125 may integrally extend from the base frame 121, whereas the other end portion thereof may be screw coupled to the side plate 140. To this end, the other end portion of the support frame 125 may include a bending portion 125a bent to face and overlap the side plate 140 to be attached thereto.

The side plate 140 and the bending portion 125a may be coupled to each other, while overlapping each other. A combining coupling member 125b may be formed in the bending portion 125a. For example, after the coupling hole of the side plate 140 and the combining coupling member 125b of the bending portion 125a are aligned with each other, a penetrating coupling member (not shown) passing through the side plate 140 may be coupled to the combining coupling member 125b so that the side plate 140 and the support frame 125 may be coupled to each other. For example, the penetrating coupling member and the combining coupling member 125b may include a bolt and a nut, respectively. In another example, the bending portion 125a of the support frame 125 may be coupled to the side plate 140 by welding.

Since the support frame 125 supports the side plates 140 arranged at both sides of the battery cells 10 and maintains a predetermined gap between the side plates 140, expansion of the battery cells 10 in a lateral direction, i.e., the left and right direction, may be reduced and deterioration of a charge/discharge characteristic due to deformation of the battery cells 10 may be prevented.

At least one bid portion 124 may be formed on the top plate 120. The bid portion 124 may be provided in a form of a plate placed on the top plate 120 to supplement mechanical strength to the top plate 120.

The top plate 120 supports a pair of the side plates 140 with a predetermined gap therebetween. Therefore, expansion of the battery cells 10 may be reduced and mechanical strength may be provided against axial rotation, i.e., axial twist, of the battery pack with respect to a direction in which the battery cells 10 are arranged. The bid portion 124 may reinforce strength of the top plate 120 and provide sufficient strength against the expansion or swelling of the battery cells 10, or the axial rotation or axial twist of the battery pack.

A cover member 180 may be arranged above the top plate 120. The cover member 180 may cover the electrode terminals 10a of the battery cells 10 and the bus bars 15 connecting the electrode terminals 10a, and may provide insulation from external environment. The cover member 180 may be formed of an insulation material, e.g., a plastic material. The cover member 180 may entirely cover the top portions of battery cells 10 and may expose some electrode terminals 10a to connect the battery pack to the outside.

The cover member 180 may be fixed on the side plate 140. In detail, the cover member 180 may include a coupling portion 185 stepped downwardly from a main surface of the cover member 180. The coupling portion 185 may be placed on the third coupling portion 143 of the side plate 140. A penetrating coupling member (not shown), e.g., a bolt, may be inserted into the coupling portion 185 of the cover member 180 and the third coupling portion 143 of the side plate 140 to form a mechanical coupling therebetween. To this end, the combining coupling member 143a forming the mechanical coupling with the penetrating coupling member may be formed in the third coupling portion 143 of the side plate 140.

The position of the cover member 180 may be fixed during the process of combining and modularizing a plurality of battery packs. For example, in the process of combining horizontally neighboring battery packs, i.e., adjacent in the left and right direction, the coupling portion 185 of the cover member 180 may be placed on the third coupling portion 143 of the battery pack, and the fixing bracket 160 of FIG. 6 may be placed thereon. The neighboring battery packs may be combined to one another, and simultaneously the cover member 180 may be fixed by using the penetrating coupling member that passes through the fixing bracket 160, the coupling portion 185 of the cover member 180, and the third coupling portion 143 of the side plate 140 to be coupled to the combining coupling member 143a. The penetrating coupling member and the combining coupling member 143a may include a bolt and a nut, respectively.

A bottom plate 190 may be arranged below a lower portion of the battery cells 10. The bottom plate 190 may extend across the bottom surfaces of the battery cells 10 in the row direction, i.e., the front and rear direction, of the battery cells 10, and support the battery cells 10. One end portion and the other end portion of the bottom plate 190 may be coupled, e.g., by screw coupling, to the lower flange portions 153 of the end plates 150 arranged at the opposite ends of the battery cells 10 in the row direction, i.e., the front and rear direction.

Figure 8:
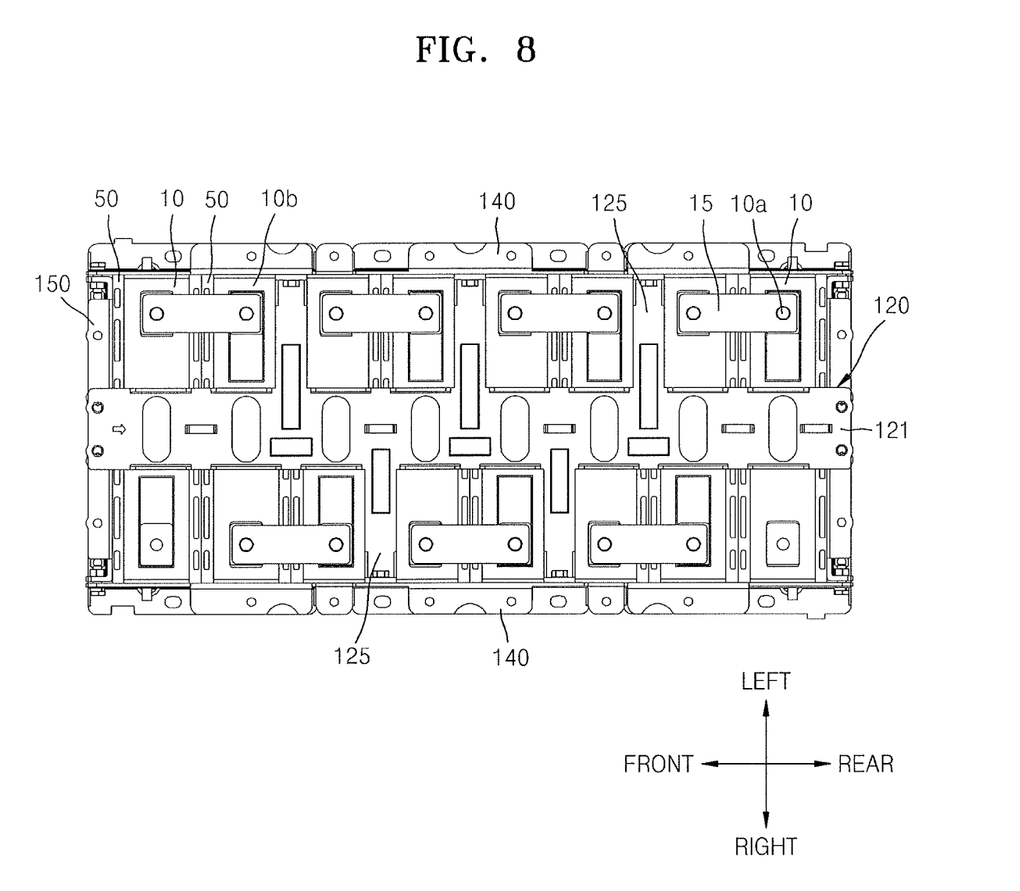
FIG. 8 illustrates a view of a shape of a top plate, showing an upper structure of a battery pack according to another embodiment.

FIG. 8 is a top view of the top plate 120, showing an upper structure of a battery pack according to another embodiment. Referring to FIG. 8, a group of the battery cells 10 forming a battery pack may be electrically connected to each other, e.g., in series, by using the bus bar 15. Each bus bar 15 may electrically connect a different pair of battery cells 10 and may be assembled by being inserted around the electrode terminals 10a of the battery cells 10. A plurality of the bus bars 15 may be assembled at alternate positions to sequentially connect a group of the battery cells 10 in the row direction, i.e., the front and rear direction, of the battery cells 10.

The top plate 120 may be arranged with the bus bar 15 on top of the battery cells 10. The bus bar 15 and the top plate 120 may be formed at positions where no interference occurs, to avoid mechanical/electrical interference therebetween.

In detail, the bus bar 15 may extend in the front and rear direction to connect a pair of neighboring battery cells 10, and a plurality of bus bars 15 may be arranged to connect different pairs of the battery cells 10. As the support frame 125 of the top plate 120 extends in a gap between adjacent bus bars 15, interference between bus bars 15 may be avoided and insulation from the bus bars 15 may be maintained. The support frame 125 may be formed to correspond to the gap of the bus bar 15. The allowable maximum number of the support frames 125 may be set according to the arrangement of the bus bars 15, e.g., a number of the support frames may equal a number of gaps between adjacent bus bars 125.

In the present embodiment, a spacer 50 may be interposed between neighboring battery cells 10. The spacer 50 electrically insulates the neighboring battery cells 10. For example, the case 10b may have an electrical polarity, so electrical interference between the neighboring battery cells 10 may be prevented by interposing the spacer 50 formed of an insulation material.

Also, the spacer 50 may provide a heat dissipation path between the battery cells 10 and a heat dissipation hole (not shown) may be formed in the spacer 50 for this purpose. A heat dissipation hole (not shown) may be formed in the side plate 140 that is assembled to cover a side surface of the spacer 50. The heat dissipation hole of the spacer 50 that is formed at a position corresponding to the heat dissipation hole of the side plate 140 are connected to each other and thus a heat dissipation path between the battery cells 10 may be provided.

The spacer 50 interposed between the battery cells 10 may restrict thermal expansion, i.e., swelling, of the battery cells 10. The case 10b of the battery cells 10 may be formed of a deformable metal material. As the spacer 50 is formed of a material, e.g., polymer, that is less deformable, the swelling of the battery cells 10 may be restricted. The spacer 50 may be arranged not only between the neighboring battery cells 10 but also closely at the outer surfaces of the battery cells 10 located at the opposite ends in the row direction, i.e., the front and rear direction, of the battery cells 10. The end plates 150 may be arranged at the opposite ends in the row direction, i.e., the front and rear direction, of the battery cells 10. In the structure, the spacer 50 may be arranged between each of the end plates 150 and a respective outermost battery cell, i.e., at the opposite ends of the structure, for electrical insulation therebetween.

According to example embodiments, two or more battery packs, each including a plurality of battery cells, may be stacked in a horizontal and/or vertical direction to form a battery module via a coupling structure providing reduced size and installation space of the overall battery module. Also, when the battery packs stacked in the horizontal and/or vertical direction are coupled to each other, a coupling position may be adjusted, thereby providing smooth coupling of neighboring battery packs in spite of a processing error. In addition, the battery packs may include position determination portions for aligning an assembly position between neighboring battery packs to a correct positions, as well as tool insertion openings for facilitating an assembly work between the battery packs.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery pack, comprising:
    first and second end plates spaced apart from each other along a first direction;
    a plurality of battery cells aligned along the first direction between the first and second end plates, each battery cell having an electrode terminal thereon; and
    a side plate extending along side surfaces of the plurality of battery cells and coupled to the first and second end plates, the side plate including:
        first coupling portions along upper edges of the side plate, the first coupling portions being bent to extend away from the battery cells, and
        second coupling portions along lower edges of the side plate, the second coupling portions being bent to extend away from the battery cells and to face the first coupling portions, the second coupling portions being positioned to at least partially correspond to respective first coupling portions,
    wherein:
        the first coupling portions are spaced apart from each other along the first direction,
        the second coupling portions are spaced apart from each other along the first direction, and
        the first coupling portions and the second coupling portions are asymmetrically arranged such that each spaced apart first coupling portion has a length in the first direction that is less than a length in the first direction of each spaced apart second coupling portion.

2. The battery pack as claimed in claim 1, wherein the side plate further comprises:
    a coupling hole in each of the first and second coupling portions;
    a penetrating coupling member inserted in the coupling hole of the first coupling portion; and
    a combining coupling member coupled to the penetrating coupling member.

3. The battery pack as claimed in claim 2, wherein the penetrating coupling member and the combining coupling member are a bolt and a nut, respectively.

4. The battery pack as claimed in claim 2, wherein the side plate further comprises an installation hole in the second coupling portion, the installation hole having a shape of an elongated slot.

5. The battery pack as claimed in claim 1, further comprising at least one third coupling portion between adjacent first coupling portions, the first and third coupling portions being at different heights relative to the second coupling portions, and the third coupling portion being bent away from the plurality of battery cells.

6. The battery pack as claimed in claim 1, wherein the side plate further comprises a tool insertion opening in the first coupling portion, the tool insertion opening being an elongated indent from an edge of the first coupling portion.

7. The battery pack as claimed in claim 6, wherein the tool insertion opening exposes at least one of a coupling hole and an installation hole in a corresponding second coupling portion.

8. The battery pack as claimed in claim 1, wherein the side plate further comprises first and second position determination portions in the second coupling portions, the first and second position determination portions having complementary shapes and are spaced apart from each other along the first direction.

9. The battery pack as claimed in claim 8, wherein the first position determination portion has an inwardly indented shape and the second position determination portion has an outwardly protruding shape.

10. The battery pack as claimed in claim 8, wherein:
    the side plate includes first and second side plates overlapping opposites side surfaces of the plurality of battery cells, the first position determination portion of the first side plate and the second position determination portion of the second side plate are aligned, and the second position determination portion of the first side plate and the first position determination portion of the second side plate are aligned.

11. A battery module, comprising:
first and second battery packs stacked along a first direction, each of the first and second battery packs including:
a plurality of battery cells aligned along a second direction between first and second end plate, each battery cell having an electrode terminal thereon, a side plate extending along side surfaces of the battery cells and coupled to the first and second end plates, the side plate including:
first coupling portions along upper edges of the side plate, the first coupling portions being bent to extend away from the battery cells, and
second coupling portions along lower edges of the side plate, the second coupling portions being bent to extend away from the battery cells and to face the first coupling portions, the second coupling portions being positioned to at least partially overlap respective first coupling portions,
wherein:
the first coupling portions are spaced apart from each other along the second direction,
the second coupling portions are spaced apart from each other along the second direction, and
the first coupling portions and the second coupling portions are asymmetrically arranged such that each spaced apart first coupling portion has a length in the second direction that is less than a length in the second direction of each spaced apart second coupling portion.

12. The battery module as claimed in claim 11, wherein the first direction is vertical, first coupling portions of the first battery pack being coupled to second coupling portions of the second battery pack via a first coupling member inserted through the first and second coupling portions.

13. The battery module as claimed in claim 12, wherein a second coupling member is coupled to the first coupling member in the first coupling portion.

14. The battery module as claimed in claim 13, wherein the first and second coupling members are a bolt and a nut, respectively.

15. The battery module as claimed in claim 11, wherein:
the first direction is horizontal,
the side plate of each of the first and second battery packs further comprises a third coupling member bent away from the plurality of battery cells, and
the first and second battery packs are coupled to each other by a first coupling member inserted through a fixing bracket and the third coupling portion of each of the first and second battery packs.

16. The battery module as claimed in claim 15, wherein the fixing bracket includes coupling holes corresponding to the third coupling portions of the first and second battery packs, one of the coupling holes in the fixing bracket having an elongated slot shape.

17. The battery module as claimed in claim 15, wherein the fixing bracket further comprises a strength reinforcement portion having a bent shape.

18. The battery module as claimed in claim 15, wherein the third coupling portion includes a second coupling member coupled to the first coupling member.

19. The battery module as claimed in claim 18, wherein the first and second coupling members are a bolt and a nut.

* * * * *